United States Patent
Rexilius et al.

(10) Patent No.: US 10,007,268 B2
(45) Date of Patent: Jun. 26, 2018

(54) METHOD FOR DETECTING OBJECTS ON A PARKING AREA

(71) Applicant: Robert Bosch GmbH, Stuttgart (DE)

(72) Inventors: Jan Rexilius, Hannover (DE); Stefan Nordbruch, Kornwestheim (DE)

(73) Assignee: ROBERT BOSCH GMBH, Stuttgart (DE)

(*) Notice: Subject to any disclaimer, the term of this patent is extended or adjusted under 35 U.S.C. 154(b) by 77 days.

(21) Appl. No.: 15/247,278

(22) Filed: Aug. 25, 2016

(65) Prior Publication Data
US 2017/0069093 A1    Mar. 9, 2017

(30) Foreign Application Priority Data

Sep. 3, 2015 (DE) .................. 10 2015 216 908

(51) Int. Cl.
| | |
|---|---|
| G06K 9/00 | (2006.01) |
| G05D 1/02 | (2006.01) |
| G06T 7/00 | (2017.01) |
| G06T 7/20 | (2017.01) |
| H04N 5/247 | (2006.01) |

(52) U.S. Cl.
CPC ......... *G05D 1/0246* (2013.01); *G05D 1/0276* (2013.01); *G06K 9/00771* (2013.01); *G06K 9/00805* (2013.01); *G06T 7/0044* (2013.01); *G06T 7/20* (2013.01); *H04N 5/247* (2013.01); *G05D 2201/0213* (2013.01); *G06T 2207/10016* (2013.01); *G06T 2207/30241* (2013.01); *G06T 2207/30261* (2013.01); *G06T 2207/30264* (2013.01)

(58) Field of Classification Search
CPC ......... G05D 1/0246; G05D 2201/0213; G06K 9/00771; G06T 2207/30264; H04N 5/247
See application file for complete search history.

(56) References Cited

U.S. PATENT DOCUMENTS

| | | | | |
|---|---|---|---|---|
| 8,077,995 B1* | 12/2011 | Terre | ................. | G06T 5/40 |
| | | | | 250/330 |
| 9,852,631 B2* | 12/2017 | Pennington | ............ | G08G 1/147 |
| 2005/0083212 A1* | 4/2005 | Chew | .................... | G08G 1/14 |
| | | | | 340/932.2 |

(Continued)

FOREIGN PATENT DOCUMENTS

| | | |
|---|---|---|
| DE | 102007002198 A1 | 7/2008 |
| DE | 102008044160 A1 | 6/2010 |

(Continued)

*Primary Examiner* — Bhavesh Mehta
*Assistant Examiner* — Ian Lemieux
(74) *Attorney, Agent, or Firm* — Norton Rose Fulbright US LLP; Gerard Messina

(57) ABSTRACT

A method for detecting objects on a parking area for vehicles with the aid of image processing of images from at least two imaging sensors, detection ranges of the imaging sensors overlapping at least partially. The images of an imaging sensor whose image quality is limited by environmental conditions are weighted less strongly for the detection of objects on the parking area during image processing than images of an imaging sensor whose image quality is not limited by environmental conditions. A processing unit, a program, and an overall system for carrying out the method are also described.

11 Claims, 4 Drawing Sheets

(56) References Cited

U.S. PATENT DOCUMENTS

| | | | | |
|---|---|---|---|---|
| 2008/0024608 A1* | 1/2008 | Hahn | ................ | B60R 1/00 |
| | | | | 348/148 |
| 2008/0033603 A1* | 2/2008 | Gensler | ............ | B62D 15/0285 |
| | | | | 701/1 |
| 2013/0129152 A1* | 5/2013 | Rodriguez Serrano | ................ | G06K 9/6255 |
| | | | | 382/105 |
| 2017/0249840 A1* | 8/2017 | Singh | ................ | G08G 1/141 |

FOREIGN PATENT DOCUMENTS

| | | |
|---|---|---|
| DE | 102011014855 A1 | 9/2012 |
| EP | 2865575 A1 | 4/2015 |

* cited by examiner

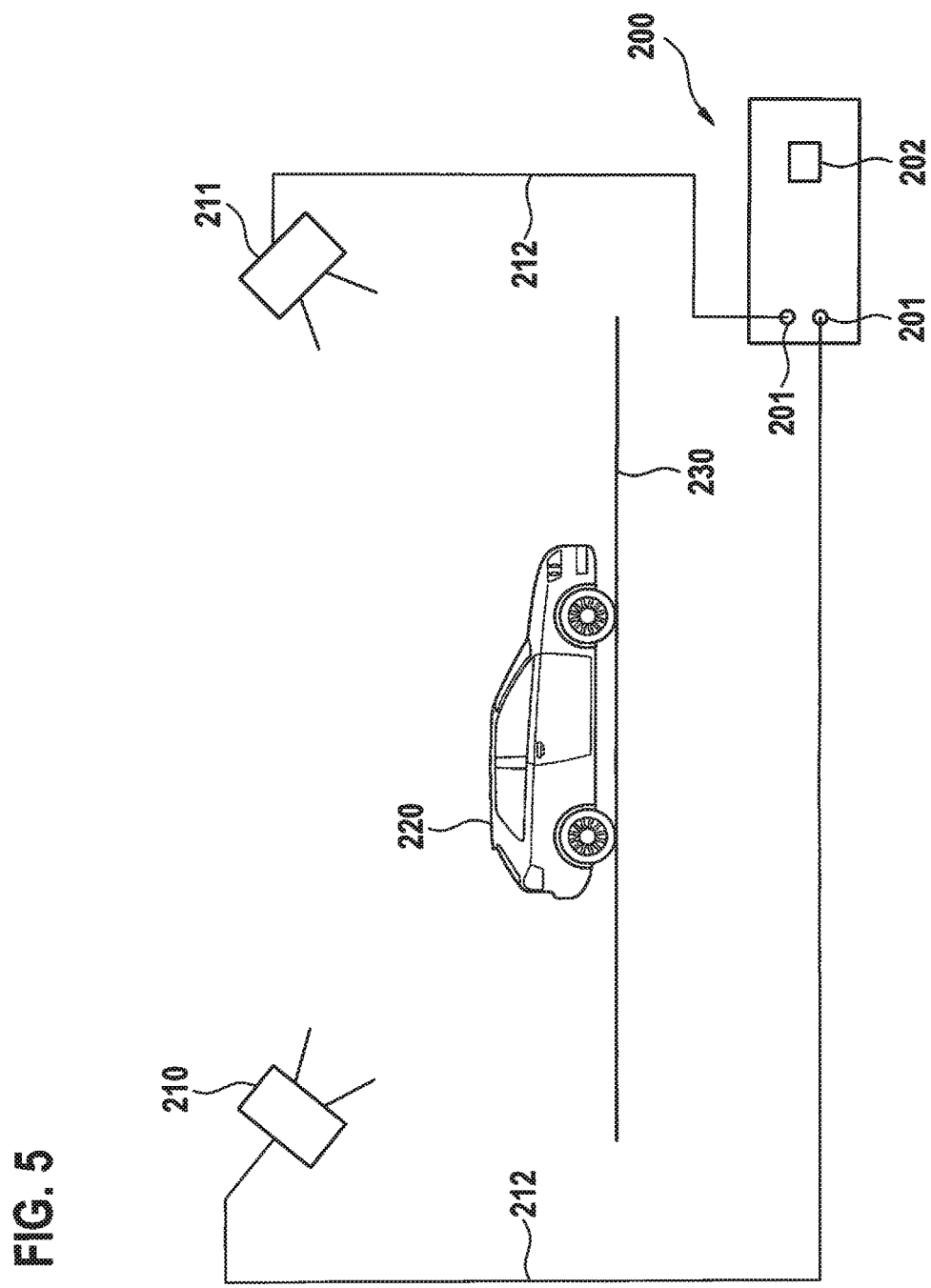

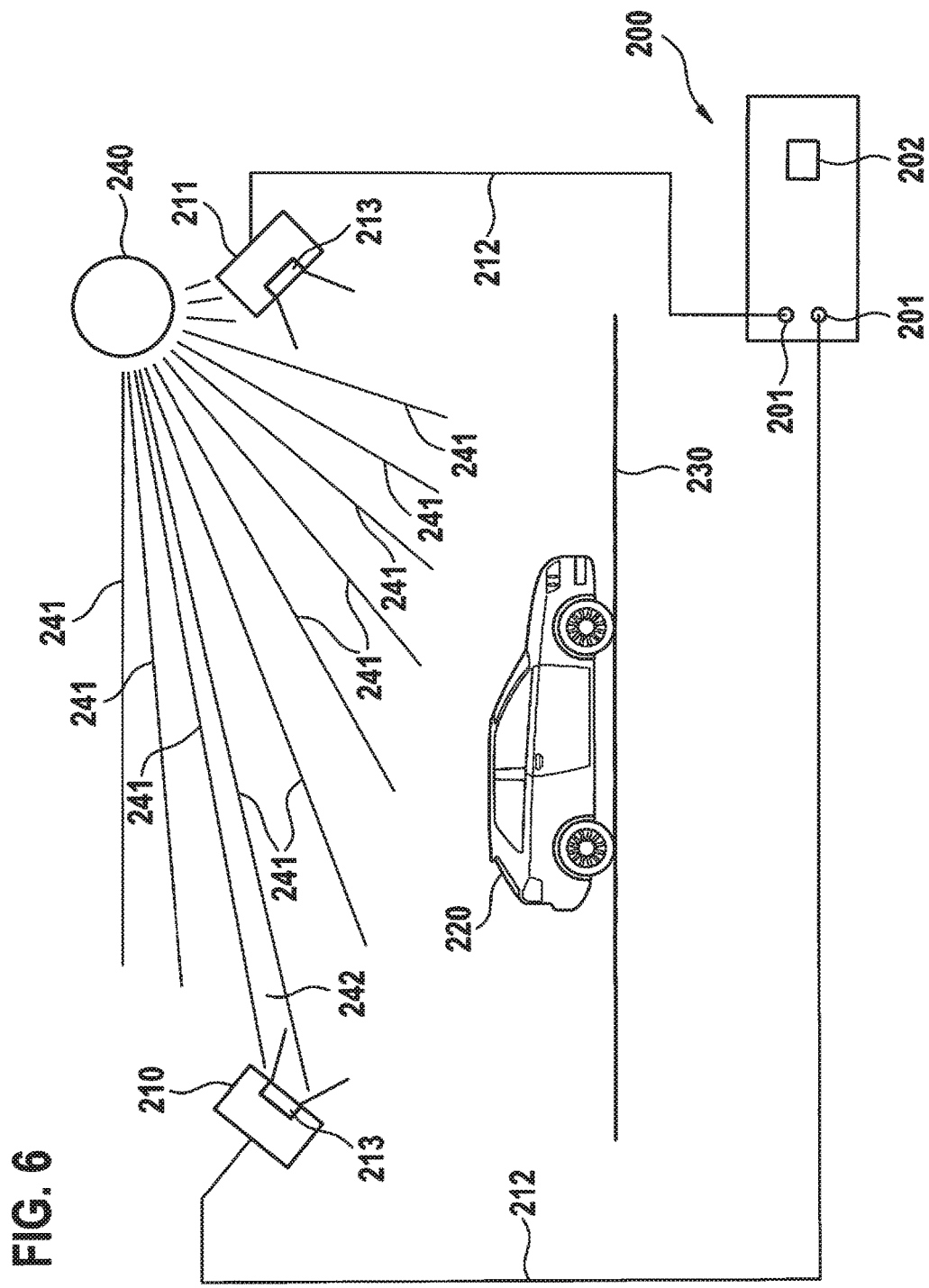

METHOD FOR DETECTING OBJECTS ON A PARKING AREA

CROSS REFERENCE

The present application claims the benefit under 35 U.S.C. § 119 of German Patent Application No. DE 102015216908.1 filed on Sep. 3, 2015, which is expressly incorporated herein by reference in its entirety.

FIELD

The present invention relates to a method for detecting objects on a parking area for vehicles, to a processing unit for carrying out the method, to a program for carrying out the method, and to an overall system which is configured to carry out the method.

BACKGROUND INFORMATION

German Patent Application No. DE 10 2007 002 198 A1 describes a method in which motor vehicles are detected on a parking area for vehicles with the aid of video image-based object tracking.

SUMMARY

One object of the present invention is to improve the method for detecting objects on a parking area for vehicles. Another object of the present invention is to provide a processing unit and a program, each of which is configured to carry out the method. Another object of the present invention is to provide an overall system made up of imaging sensors, a processing unit and a program, the overall system being configured to carry out the method.

These objects may be achieved by the method for detecting objects on a parking area, by the processing unit, by the program, and by the overall system in accordance with the present invention.

In a method for detecting objects on a parking area for vehicles, the objects are detected with the aid of image processing of images from at least two imaging sensors. The detection ranges of the imaging sensors overlap at least partially, and the images of an imaging sensor whose image quality is limited by environmental conditions is weighted less strongly for the detection of objects on the parking area during the image processing than images of an imaging sensor whose image quality is not limited by environmental conditions. During the detection of objects on a parking area for vehicles, in particular when the parking area is situated outdoors, it is possible that the imaging sensors used to detect the objects are compromised by environmental conditions. For example, solar radiation, or rain, or snow, or fog may impair the image quality of one or multiple imaging sensors. During the detection of the objects on the parking area, it is useful to weight imaging sensors whose image quality is limited by the above-mentioned environmental conditions less strongly than sensors whose image quality is not limited by environmental conditions. The detection of objects on the parking area is thus improved.

The parking area for vehicles is made up of parking positions or parking spaces and the associated travel paths. The parking area may be situated outdoors or in a building. In the latter case, this may also be referred to as a parking garage.

In one specific embodiment, the detection ranges of more than two imaging sensors overlap at least partially, the images of more than two imaging sensors being used to detect objects on the parking area with the aid of image processing. The greater the number of imaging sensors is, the better the method for detecting objects on the parking area may be carried out.

In one specific embodiment, the limited image quality of an imaging sensor is detected with the aid of image processing. The environmental conditions which impair the image quality of the imaging sensor change the images of the corresponding imaging sensor in such a way that these changes are detectable with the aid of image processing. For example, if solar radiation were to degrade the image quality of an imaging sensor, this may be detected with the aid of image processing in that the images of the corresponding imaging sensor receive considerably stronger exposure than other images from other imaging sensors not impaired by solar radiation. Should it thus be detected that the images of an imaging sensor have a higher exposure, these images may be weighted less strongly during the detection of objects.

In one specific embodiment, the limited image quality of an imaging sensor is detected with the aid of a comparison of the image of the imaging sensor to a reference image of the imaging sensor recorded at another point in time. This may be carried out, for example, when fog, snow or rain causes the contours of structures, such as lines, on the parking area to be depicted less sharply than in a reference image which was recorded without the above-mentioned environmental conditions. In this way, it is possible to identify images from imaging sensors in which the image quality is limited by environmental conditions, and these images may be weighted less strongly during the detection of objects.

In one specific embodiment, times during which an imaging sensor has a limited image quality are calculated with the aid of the geographical location of the imaging sensor and/or orientation of the imaging sensor and/or date and/or time. This is in particular advantageous when calculating times during which the image quality of an imaging sensor is limited due to solar radiation. Based on the position and the orientation of the imaging sensor, the date and the time, it is possible to calculate all times at which the sun is positioned in such a way that sunlight shines directly into the corresponding imaging sensor. When sunlight shines directly into the imaging sensor, the image quality of the imaging sensor is limited. By calculating the times during which the image quality is limited, it is possible to predetermine even without image processing when images of an imaging sensor have a lower image quality due to the solar radiation.

In one specific embodiment, a piece of information about an object detected on the parking area, in particular a position and a dimension of the detected object, is relayed with the aid of a transmitter to a receiver in a vehicle including a device for automatically executing at least one driving function. As a result of the relay of the position and of the dimension of the detected object on the parking area to a vehicle including a device for automatically executing at least one driving function, this vehicle is able to take the detected object into consideration in its own route selection. It is thus easier for the vehicle to determine a route to a parking lot, which the vehicle is able to follow to automatically execute at least one driving function.

In one specific embodiment, a trajectory for a vehicle is calculated based on the objects detected on the parking area. This trajectory is relayed with the aid of a transmitter to a receiver in a vehicle including a device for automatically executing at least one driving function. As a result, a fully automatic operation of the parking area is achievable in that the detected objects on the parking area are used to calculate the trajectories for the vehicles on the parking area and notify the vehicles about this trajectory. The vehicle may follow the trajectory to a free parking space.

A processing unit includes connections for at least two imaging sensors and is configured to carry out one of the methods. The connections are data connections to process the pictures or images of the imaging sensors in the processing unit. The image processing which is used to detect the objects on the parking area thus takes place in this processing unit.

In one specific embodiment, the processing unit includes a transmitter which is configured to relay detected objects or trajectories to vehicles. This processing unit is thus suitable for automatically operating the parking garage or the parking area. A program which includes program code for carrying out the method when the program is executed on a processing unit allows the operation of an automated parking area for vehicles.

With the aid of an overall system, made up of at least two imaging sensors and a processing unit, which is connected to the imaging sensors and which includes a transmitter, is configured to carry out the method.

In one specific embodiment, two imaging sensors are situated in such a way that the image quality of the two imaging sensors is not simultaneously impaired by environmental conditions, in particular solar radiation.

Exemplary embodiments of the present invention are described based on the figures.

BRIEF DESCRIPTION OF THE DRAWINGS

FIG. 5 shows an overall system.

FIG. 6 shows an overall system in which the image quality of a camera is limited by an environmental condition.

DETAILED DESCRIPTION OF EXAMPLE EMBODIMENTS

Figure 1:
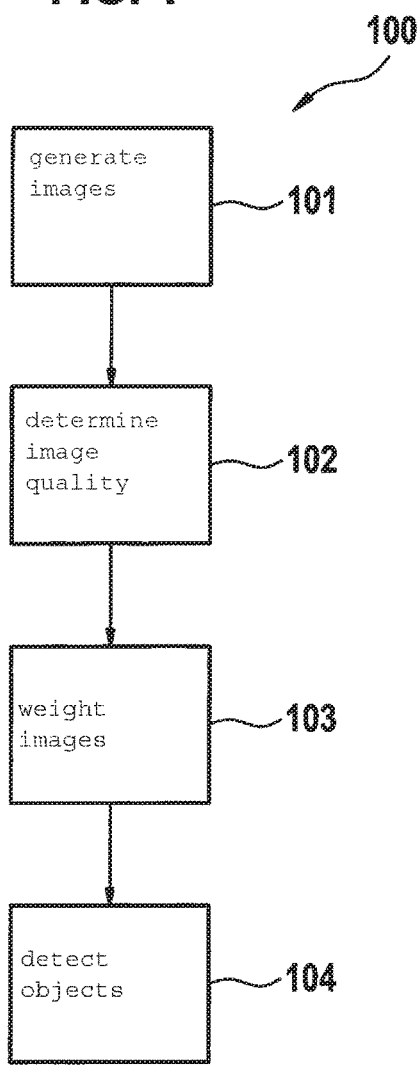
FIG. 1 shows a flow chart of the method.

FIG. 1 shows a flow chart 100 of a method for detecting objects on a parking area for vehicles. In a first method step 101, an image is generated in each of at least two cameras, recording areas of the cameras overlapping at least partially. In a second method step 102, the image quality of the images is determined. The image quality of the cameras may be limited by environmental conditions, for example. Should the image quality be limited by environmental conditions, this is taken into consideration in the determination of the image quality. In a third method step 103, the images of the at least two cameras are weighted based on whether the image quality is limited by environmental conditions. The weighting of images of a camera whose image quality is limited by environmental conditions may be 0%, for example, and the weighting of images of a camera whose image quality is not limited by environmental conditions may be 100%. A different weighting of images of a camera whose image quality is limited by environmental conditions is also possible, for example 50%. When an image of a camera is compromised by environmental conditions, i.e., the camera has a lower image quality, the corresponding images of the camera are thus weighted less strongly in third method step 103 than images of a camera whose image quality is not limited by environmental conditions. In a fourth method step 104, objects on the parking area are detected with the aid of image processing of the images, the weighting of the images from third method step 103 being taken into consideration. The detection of objects on the parking area is carried out, among other things, in that it is detected where an object is situated on the parking area, i.e., the position of the object is determined. Moreover, a dimension of the object may be ascertained, so that it is possible to establish the surface area which the object occupies.

In one exemplary embodiment, more than two images are created by more than two cameras in first method step 101, which then pass through further method steps 102 through 104.

In one exemplary embodiment, a limited image quality of a camera is ascertained with the aid of image processing in second method step 102. Should, for example, a camera be situated in such a way that it is possible for solar radiation to directly strike the camera, the image quality of the camera is limited during the times during which this takes place. With the aid of image processing, it is possible to ascertain, for example, that the image of one camera is exposed considerably more strongly than the image of a second camera or of a reference. It is possible to infer from this that sunlight directly struck the camera at the moment the image was recorded, whereby the high exposure was generated. By monitoring the exposure values, it is thus possible to establish whether a limited image quality exists for a camera.

It is also possible to ascertain a limited image quality due to snow, fog or rain in that lines or objects on the parking area lose their contour and thereby are less sharp in the images than without the interfering environmental conditions. It is thus also possible to ascertain images of cameras in which the image quality is limited by environmental conditions.

In one exemplary embodiment, in second method step 102 a limited image quality of a camera is ascertained with the aid of a comparison of the image to a reference image recorded at a different point in time.

In one exemplary embodiment, in second method step 102 the image quality is determined by calculating times during which a camera has a limited image quality with the aid of a geographical location and/or an orientation of the camera and/or a date and/or a time. In particular, limited image qualities due to solar radiation may be calculated in advance from the position and orientation of the camera, the date and the time. In this way, it is possible to ascertain times during which it is predictable that the sun will directly strike a camera, and to weight the images during this point in time to a lesser degree if they are used to detect objects on the parking area.

Figure 2:
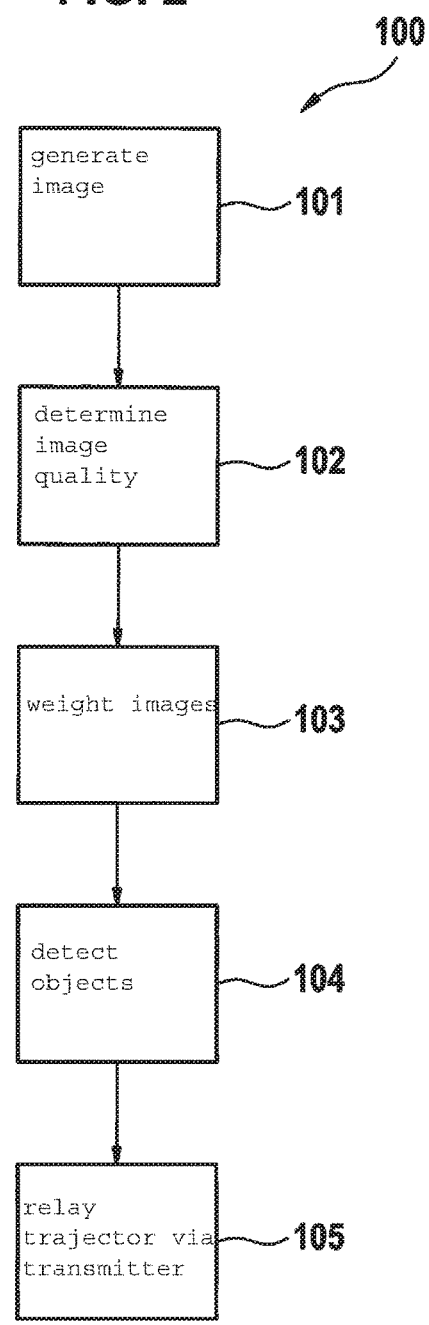
FIG. 2 shows a flow chart of the method including further, optional method steps.

FIG. 2 shows another flow chart 100 in which method steps 101 through 104 correspond to the method steps from FIG. 1. A fifth method 105 includes the relay of an object detected on the parking area, in particular a position and a dimension of the detected object, with the aid of a transmitter to a receiver in a vehicle including a device for automatically executing at least one driving function. By relaying the position and the dimension of the object, the vehicle including a device for automatically executing at least one driving function is thus able to plan its trajectory on the parking area.

In one exemplary embodiment, in fifth method step 105 the position and the dimension of an object are not relayed, but based on the detected objects a trajectory for a vehicle on the parking area is ascertained, and this trajectory is relayed via a transmitter to a vehicle including a device for automatically executing at least one driving function. The device for automatically executing at least one driving function of a vehicle may then guide the vehicle along the relayed trajectory to a parking area, which is to say a parking space, or out of the parking space again to the exit of the parking area.

The method may also be carried out using other imaging sensors instead of the cameras. It is also possible to combine a camera with another imaging sensor in a recording range. Other imaging sensors may be laser scanners, radar scanners or LIDAR scanners. These other imaging sensors also supply images of the parking area whose image quality may be limited due to environmental conditions, and which may be processed further in the same manner in the method as images from cameras.

Figure 3:
FIG. 3 shows one exemplary embodiment of a processing unit.

FIG. 3 shows a processing unit 200 including two connections 201 for one camera in each case. This processing unit 200 is configured to carry out the method from FIG. 1.

Figure 4:
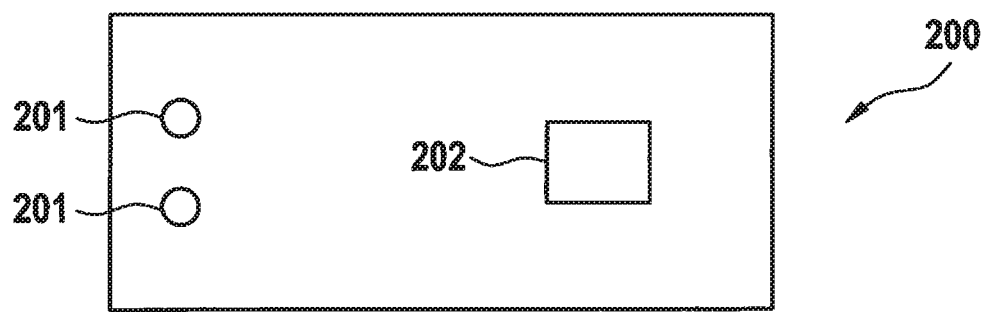
FIG. 4 shows a further exemplary embodiment of a processing unit.

FIG. 4 shows a processing unit 200 which is configured to carry out the method from FIG. 2. Processing unit 200 also includes two connections 201 for cameras, and moreover, processing unit 200 includes a transmitter 202, which is configured to relay data to a vehicle. Connections 201 from FIGS. 3 and 4 may also be configured in such a way that only one connection is present on processing unit 200, to which multiple cameras are connected. For example, a bus system may be used for the cameras, or the images of the camera may be relayed in encoded form via the one connection 201 to the processing unit.

Likewise, connections for other imaging sensors may be provided.

FIG. 5 shows an overall system for detecting objects on a parking area 230. Parking area 230 is made up of parking positions or parking spaces and the associated travel paths. The parking area may be situated outdoors or in a building. An object, which is a vehicle 220 here, is situated on parking area 230. The object, however, may also be a pedestrian or another object. A first camera 210 and a second camera 211 are directed at parking area 230 in such a way that their detection ranges overlap. First camera 210 and second camera 211 are each connected via a data line 212 to connections 201 for cameras of a processing unit 200. Moreover, processing unit 200 includes a transmitter 202; processing unit 200 thus corresponds to processing unit 200 from FIG. 4. Vehicle 220 is situated in the detection ranges of first camera 210 and of second camera 211 and is thus detectable by both cameras 210, 211 with the aid of image processing.

FIG. 6, in turn, shows a parking area 230 including a vehicle 220 and also the further components from FIG. 5. Moreover, sun 240 is shown, along with various sun rays 241. A bundle of rays 242 strikes lens 213 of first camera 210. Sun rays do not strike lens 213 of second camera 211 since second camera 211 includes a diaphragm which shades lens 213 of the second camera. Due to the bundle of sun rays 242 striking lens 213 of first camera 210, the image of first camera 210 is considerably more strongly exposed than if no sun rays were to strike lens 213 of first camera 210. Due to the high exposure of the image, in second method step 102 of FIG. 1 or 2 a reduced image quality of first camera 210 due to environmental conditions may be determined. The images of first camera 210 may in this case be weighted less during the detection of the object, which is vehicle 220 here, on parking area 230 than the images of second camera 211.

It is also possible to determine the reduced image quality of first camera 210 in FIG. 6 by calculating the position of sun 240 from the date and time, and by calculating times during which a bundle of rays 242 strikes first camera 210 from the position and orientation of first camera 210. During these times, the images of first camera 210 are weighted less strongly during the detection of objects, which is vehicle 220 here, on parking area 230 than the images of second camera 211 which is not limited by sun 240 during these times.

First camera 210 and second camera 211 are positioned in such a way that their image qualities are not simultaneously limited by sun rays 214.

Cameras 210, 211, like other imaging sensors which are provided instead of or in addition to the cameras, may be attached immovably or movably.

Although the present invention was illustrated and described in greater detail by the preferred exemplary embodiments, the present invention is not limited by the described examples and other variations may be derived therefrom by those skilled in the art without departing from the scope of the present invention.

What is claimed is:

1. A method for detecting objects on a parking area for vehicles with the aid of image processing of images from at least two imaging sensors, wherein detection ranges of the imaging sensors overlap at least partially, the method comprising:
   determining which of the imaging sensors has an image quality limited by environmental conditions, the determining being based on: (i) a position and orientation of each of the imaging sensors, (ii) a date, and (iii) a time;
   processing images from the imaging sensors including less strongly weighting images of the determined imaging sensor of the imaging sensors whose image quality is limited by environmental conditions than images of an imaging sensor of the imaging sensors whose image quality is not limited by environmental conditions; and
   detecting objects on the parking area based on the processed images.

2. The method as recited in claim 1, wherein the imaging sensors are each designed as at least one of a camera, a laser scanner, a radar scanner, and a LIDAR scanner.

3. The method as recited in claim 1, wherein objects on the parking area are detected with the aid of image processing of images from more than two imaging sensors, detection ranges of more than two imaging sensors in each case overlapping at least partially.

4. The method as recited in claim 1, wherein the limited image quality of an imaging sensor is detected with the aid of image processing.

5. The method as recited in claim 4, wherein the limited image quality of an imaging sensor is ascertained with the aid of a comparison of an image from the imaging sensor to a reference image of the imaging sensor recorded at another point in time.

6. The method as recited in claim 1, wherein a piece of information about an object detected on the parking area, including a position and a dimension of the detected object, is relayed with the aid of a transmitter to a receiver in a vehicle including a device for automatically executing at least one driving function.

7. The method as recited in claim 1, wherein a trajectory for a vehicle including a device for automatically executing at least one driving function is calculated based on the objects detected on the parking area, and the trajectory is relayed with the aid of a transmitter to a receiver in the vehicle.

8. A processing unit, which includes connections for at least two imaging sensors, for detecting objects on a parking area for vehicles with the aid of image processing of images from the imaging sensors, wherein detection ranges of the imaging sensors overlap at least partially, the processing unit designed to:
- determine which of the imaging sensors has an image quality limited by environmental conditions, the determining being based on: (i) a position and orientation of each of the imaging sensors, (ii) a date, and (iii) a time;
- process images from the imaging sensors including less strongly weighting images of the determined imaging sensor of the imaging sensors whose image quality is limited by environmental conditions than images of an imaging sensor of the imaging sensors whose image quality is not limited by environmental conditions; and
- detect objects on the parking area based on the processed images.

9. The processing unit as recited in claim 8, wherein the processing unit further comprises a transmitter.

10. A non-transitory computer-readable storage medium storing program code for detecting objects on a parking area for vehicles with the aid of image processing of images from at least two imaging sensors, the program code, when executed by a processing unit, causing the processing unit to perform:
- determining which of the imaging sensors has an image quality limited by environmental conditions, the determining being based on: (i) a position and orientation of each of the imaging sensors, (ii) a date, and (iii) a time;
- processing images from the imaging sensors including less strongly weighting images of the determined imaging sensor of the imaging sensors whose image quality is limited by environmental conditions than images of an imaging sensor of the imaging sensors whose image quality is not limited by environmental conditions; and
- detecting objects on the parking area based on the processed images.

11. An overall system, comprising:
at least two imaging sensors; and
a processing unit including a transmitter, the processing unit connected to the imaging sensors;
wherein the overall system is configured to determine which of the imaging sensors has an image quality limited by environmental conditions, the determining being based on: (i) a position and orientation of each of the imaging sensors, (ii) a date, and (iii) a time, process images from the imaging sensors including less strongly weighting images of the determined imaging sensor of the imaging sensors whose image quality is limited by environmental conditions than images of an imaging sensor of the imaging sensors whose image quality is not limited by environmental conditions, and detect objects on the parking area based on the processed images.

* * * * *